United States Patent [19]
Otaki et al.

[11] Patent Number: 5,559,812
[45] Date of Patent: Sep. 24, 1996

[54] DIGITAL TIME BASE CORRECTOR USING A MEMORY WITH REDUCED MEMORY CAPACITY

[75] Inventors: Hitoshi Otaki; Masahiro Nakajima, both of Koufu, Japan

[73] Assignees: Pioneer Video Corporation, Yamanashi; Pioneer Electronics Corporation, Tokyo, both of Japan

[21] Appl. No.: 357,736

[22] Filed: Dec. 16, 1994

[30] Foreign Application Priority Data

Dec. 16, 1993 [JP] Japan .................. 5-316940

[51] Int. Cl.⁶ .................. H04N 7/00; H04N 11/00; H04N 9/88; H04N 9/89
[52] U.S. Cl. .................. 371/31; 348/497; 348/498; 358/314; 358/326
[58] Field of Search .................. 371/31; 348/497, 348/498, 513, 514; 358/320, 326

[56] References Cited

U.S. PATENT DOCUMENTS

| | | |
|---|---|---|
| 3,860,952 | 1/1975 | Tallent et al. .................. 348/498 |
| 4,063,284 | 12/1977 | Tatami .................. 348/497 |
| 4,081,826 | 3/1978 | Ninomiya .................. 348/498 |
| 4,120,000 | 10/1978 | Ninomiya .................. 348/513 |
| 4,287,529 | 9/1981 | Tatami et al. .................. 358/320 |
| 4,373,168 | 2/1983 | Mizukami et al. .................. 348/498 |
| 4,438,456 | 3/1984 | Yoshinaka .................. 348/513 |
| 4,709,276 | 11/1987 | Yoshinaka .................. 358/326 |
| 4,733,311 | 3/1988 | Yoshinaka .................. 358/320 |

*Primary Examiner*—Roy N. Envall, Jr.
*Assistant Examiner*—Emmanuel L. Moise
*Attorney, Agent, or Firm*—Sughrue, Mion, Zinn, Macpeak & Seas

[57] ABSTRACT

A digital time base corrector uses a memory with a reduced storage capacity, to reduce the cost. Absolute value data of an amplitude and polarity data of a burst signal in a color video signal are written into a memory every horizontal scan period. A signal in which a sync signal interval, a pedestal level interval, and a burst signal interval in the color video signal are eliminated is written as image data into the memory. The absolute value data, polarity data, and image data are read out from the memory. Burst signal data is reproduced on the basis of the absolute value data and polarity data. By inserting the burst signal data, sync signal data, and pedestal level data into the image data, a color video signal is reproduced.

2 Claims, 9 Drawing Sheets

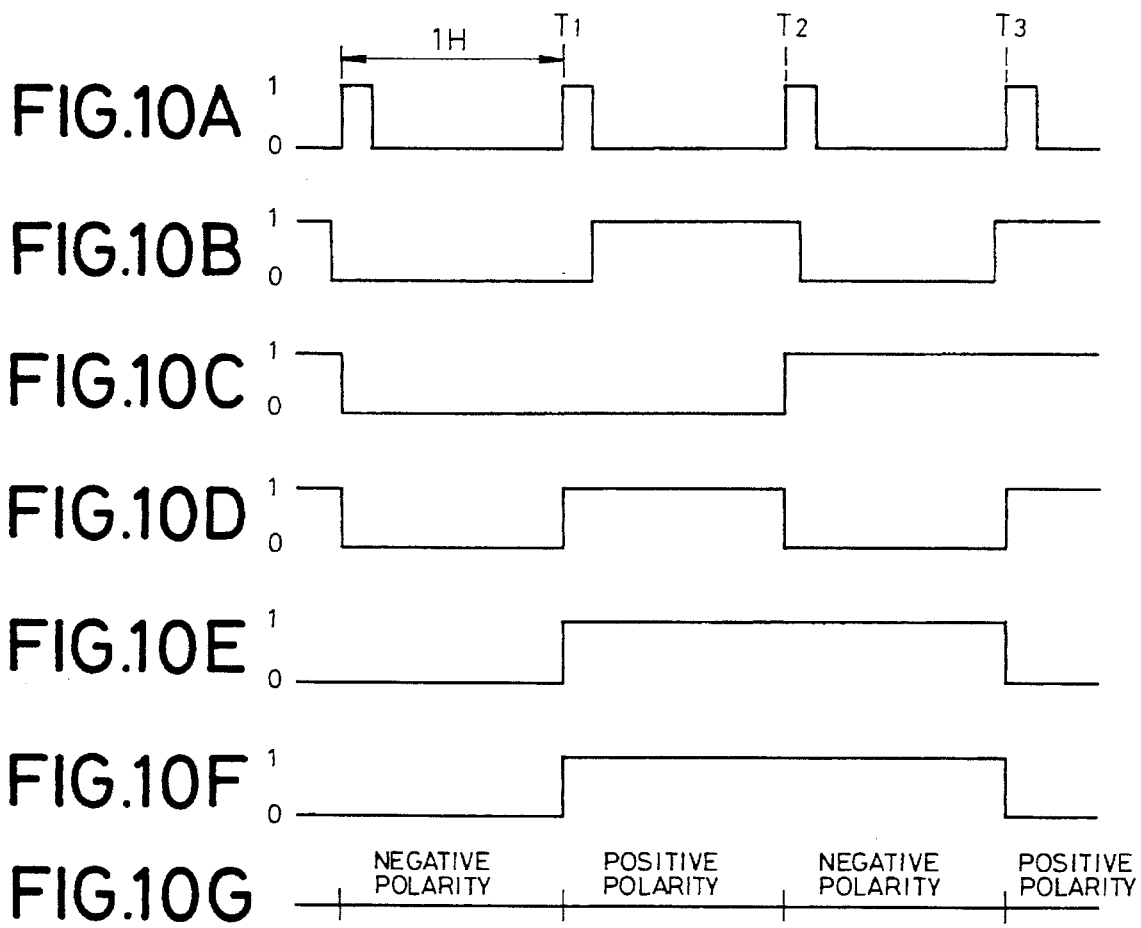

DIGITAL TIME BASE CORRECTOR USING A MEMORY WITH REDUCED MEMORY CAPACITY

BACKGROUND OF THE INVENTION

1. Field of the Invention

The present invention relates to a digital time base corrector for performing a time base correction operation in which a composite color video signal read out from a recording medium and subsequently reproduced is converted to digital data and written into a memory, and the written data is read out from the memory, to output the data as a color video signal.

2. Description of Background Information

When a color video signal recorded on a video disk is simply demodulated and reproduced, the reproduced video signal may include a fine jitter due to eccentric components of the video disk and vibrations caused in the mechanical system of the apparatus, resulting in a time base error of the reproduction video signal representing a deviation from a reference time base. For correcting this time base error, a known digital time base corrector is constructed such that the reproduction video signal is converted to the digital data by an A/D converter and, after that, the digital data is written to a memory and the written data is read out synchronously with a reference timing signal in accordance with the writing order and is converted to the analog signal by a D/A converter. A conventional time base corrector is disclosed, for example, in Japanese Patent Application Kokai No. 1-9327.

In this digital time base corrector, all of the digital data produced by the A/D converter for converting the color video signal to the digital data, or data from which the sync signal portion is removed is written into a memory is written into the memory. A large memory capacity is, consequently, needed for the memory, resulting in an increase in costs of the apparatus.

OBJECTS AND SUMMARY OF THE INVENTION

It is an object of the invention to provide a digital time base corrector which can use a memory having a reduced memory capacity, and therefore can reduce the cost.

A digital time base corrector of the invention comprises: A/D converting means for converting a read composite color video signal to a digital signal; means for extracting a burst signal in the digital signal every horizontal scanning period and for generating absolute value data of an amplitude of the burst signal and polarity data; writing means for writing the absolute value data and the polarity data to a memory and for writing the portion which is obtained by eliminating a sync signal interval, a pedestal level interval, and a burst signal interval from the digital signal into the memory as image data; reading means for reading out the absolute value data, polarity data, and image data from the memory; burst reproducing means for reproducing burst signal data on the basis of the absolute value data and the polarity data which were read out; data inserting means for inserting the burst signal data, sync signal data, and pedestal level data into the read image data; and D/A converting means for converting the output data of the data inserting means to an analog signal and outputting the analog signal as a color video signal.

According to the digital time base corrector of the invention, in case of writing the data, the absolute value data of the amplitude of the burst signal and the. polarity data in the color video signal are written in the memory every horizontal scan period and also the signal obtained by eliminating the sync signal interval, pedestal level interval, and burst signal interval from the color video signal is written in the memory as image data. In case of reading the data, the absolute value data, polarity data, and image data are read out from the memory. The burst signal data is reproduced on the basis of the absolute value data and the polarity data. By inserting the burst signal data, sync signal data, and pedestal level data into the image data, a digital color video signal is formed and is converted to the analog signal.

BRIEF DESCRIPTION OF THE DRAWINGS

FIGS. 10A to 10G are diagrams showing the operation in a state in which the reading position is advanced than the writing position in the image data memory.

DETAILED DESCRIPTION OF THE PREFERRED EMBODIMENT

An embodiment of the invention will now be explained in detail hereinbelow with reference to the drawings.

Figure 1:
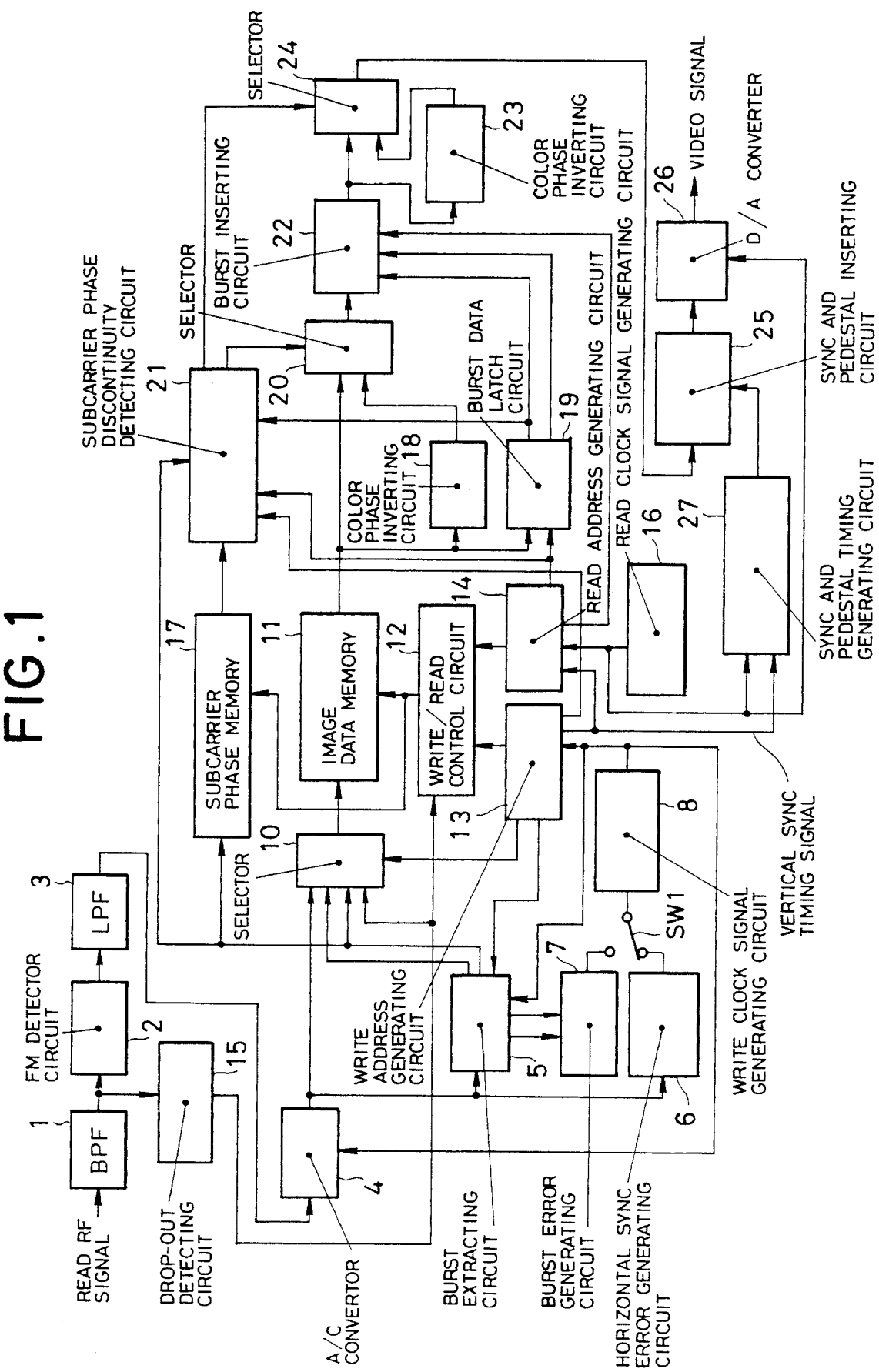
FIG. 1 is a block diagram showing an embodiment of the invention.
Figure 2:
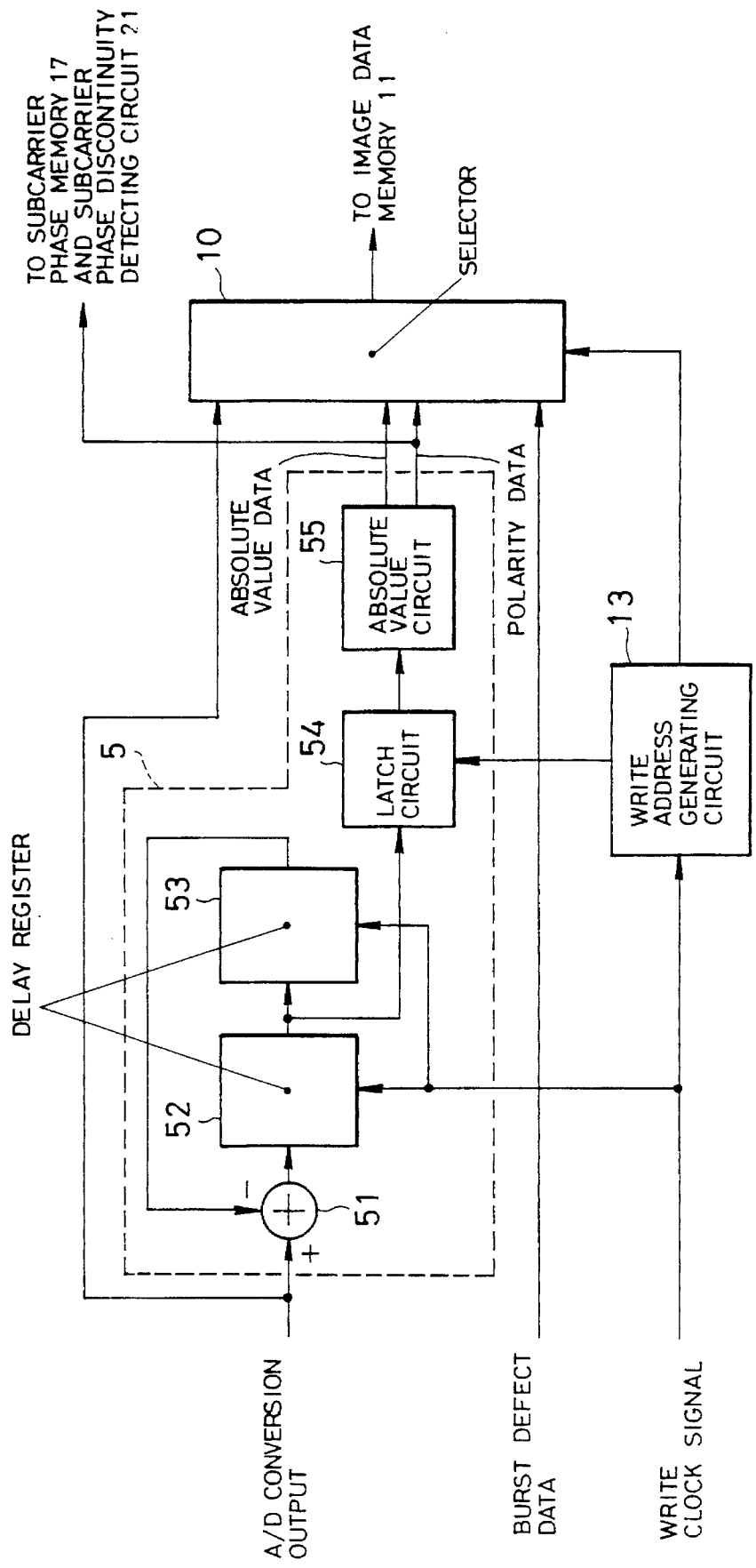
FIG. 2 is a block diagram specifically showing a portion of a burst extracting circuit.

FIG. 1 shows a digital time base corrector according to the invention. In the digital time base corrector, a read RF signal generated from a pickup (not shown) of a video disk player is supplied to a BPF (band pass filter) 1 by which only a video signal band component is extracted and supplied to an FM detector circuit 2. The composite video signal which was demodulated by the FM detector circuit 2 is supplied to an A/D converter 4 through an LPF (low pass filter) 3. The A/D converter 4 generates the digital video signal which comprises video data of every one pixel. A burst extracting circuit 5 and a horizontal sync error generating circuit 6 are connected to the converted output of the A/D converter 4. The burst extracting circuit 5 generates a color burst signal component of the digital video signal generated from the A/D converter 4 as an SIN (sine) component signal and a COS (cosine) component signal and also has a construction to obtain the polarity of the burst signal and the absolute value of the amplitude of the burst signal from the COS component signal. In the burst extracting circuit 5, a subtractor 51 is provided for an output of the A/D converter 4 as shown in FIG. 2 in order to obtain the polarity and the absolute value of the amplitude of the burst signal. The subtractor 51 receives the digital video signal generated from the A/D converter 4 at one positive (+) input. An output signal of the subtractor 51 is supplied to the other negative (−) input of the subtractor 51 though two delay registers 52 and 53. A write clock signal is supplied to the delay registers 52 and 53 and the digital video signal is delayed by a time of two samples. A latch circuit 54 is connected to an output of the delay register 52. The latch circuit 54 holds a sample of the burst signal at a predetermined position in 1 H (H: horizontal scan period) of the video signal in accordance with a burst timing signal and supplies it to an absolute value circuit 55. The absolute value circuit 55 obtains the polarity of the burst signal and the absolute value of the amplitude of the burst signal from the data held in the latch circuit 54. The burst signal is held as data of a predetermined number of bits in the latch circuit 54. The MSB (most significant bit) is the polarity data and the subsequent lower bits are the absolute value data.

The SIN component signal and the COS component signal generated from the burst extracting circuit 5 are supplied to a burst error generating circuit 7. The burst error generating circuit 7 calculates a TAN component signal by dividing the SIN component signal by the COS component signal and retrieves an angle component as a burst error signal from the TAN component signal from a predetermined table and supplies to a memory (not shown).

The horizontal sync error generating circuit 6 separates and extracts the horizontal sync signal component in the digital video signal supplied from the A/D converter 4. The horizontal sync error signal is calculated from the separated and extracted horizontal sync signal component by an error arithmetic operation circuit including a loop circuit comprising a PLL.

A change-over switch SW1 is connected to each of outputs of the horizontal sync error generating circuit 6 and the burst error generating circuit 7. The change-over switch SW1 selectively relays either one of the burst error signal and the horizontal sync error signal to a write clock signal generating circuit 8 in accordance with a switching signal from a change-over control circuit, which will be described hereinafter. For instance, in the case where a condition that a tracking servo loop is in a closed state and a loop circuit in the horizontal sync error generating circuit 6 is in a locked state is continued for 3 H or longer, the output signal of the burst error generating circuit 7 is relayed to the write clock signal generating circuit 8. The write clock signal generating circuit 8 comprises a PLL circuit and generates a write clock signal in accordance with the horizontal sync error signal or the burst error signal. The write clock signal is supplied to the A/D converter 4 and a write address generating circuit 13, which will be described hereinafter.

An image data memory 11 is connected to an output of the A/D converter 4 through a selector 10. The image data memory 11 comprises an FIFO (First-In First-Out) memory and has storage locations to store video data of 768 pixels of which number is smaller than 910 pixels of 1 H. The writing and reading operations of data to/from the image data memory 11 are controlled by a write/read control circuit 12. The write address generating circuit 13 for generating write address data to designate the write storage location in the image data memory 11 and a read address generating circuit 14 for generating read address data to designate the read storage location are connected to the write/read control circuit 12.

A drop-out detecting circuit 15 to detect a signal drop-out is connected to an output terminal of the BPF 1. A detection output of the circuit 15 is supplied to the selector 10 and the write/read control circuit 12. In addition to the digital video signal from the A/D converter 4 and the detection output of the signal drop-out, polarity data and absolute value data are also supplied from the latch circuit 54 to the selector 10. The detection output of the signal drop-out is supplied as burst defect data, namely, the drop-out detection signal of the burst signal. The selector 10 selectively relays either one of the video data and the burst compression data comprising the burst defect data, polarity data, and absolute value data to the image data memory 11 in accordance with the selection timing signal.

A subcarrier phase memory 17 is connected to the polarity data output of the latch circuit 54. The subcarrier phase memory 17 has storage locations to store the polarity data of only the number as many as the number of video data storing times (for example, 768) of the image data memory 11. The writing and reading operations of the subcarrier phase memory 17 are controlled by the write/read control circuit 12. The image data memory 11 and the subcarrier phase memory 17 have the storage locations which mutually correspond. When the write address data is generated by the write address generating circuit 13, the mutually corresponding storage locations in the image data memory 11 and subcarrier phase memory 17 are designated by the write address data. Similarly, when the read address data is generated by the read address generating circuit 14, the mutually corresponding storage locations in the image data memory 11 and subcarrier phase memory 17 are designated by the read address data.

Figure 3:
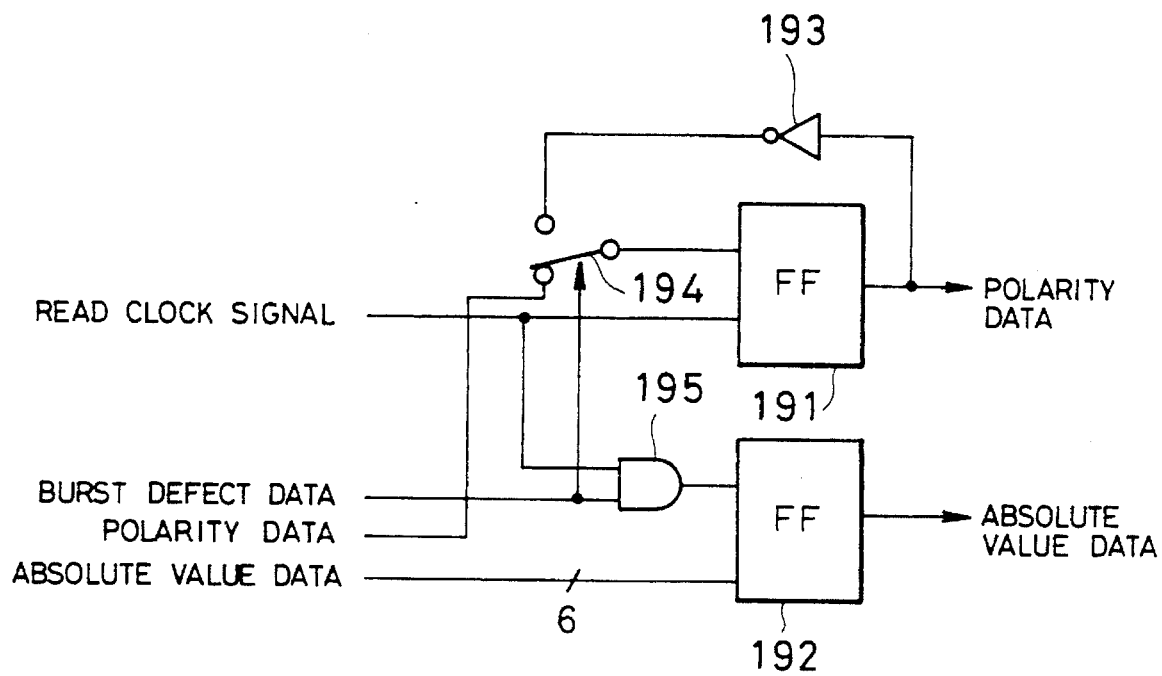
FIG. 3 is a block diagram specifically showing a burst data latch circuit.

A color phase inverting circuit 18, a burst data latch circuit 19, and a selector 20 are connected to the read output of the image data memory 11. The color phase inverting circuit 18 inverts a color phase of the video data read out from the image data memory 11 and supplies the video data in which the color phase was inverted to the selector 20. The burst data latch circuit 19 holds the polarity data and the absolute value data which were read out from the image data memory 11. As shown in FIG. 3, flip-flops (FFs) 191 and 192 are provided as latch devices in the burst data latch circuit 19. A read 1 H clock signal is supplied as a latch timing signal from the read address generating circuit 14 to one input terminal of the FF 191. The polarity data read out from the image data memory 11 or the data obtained by inverting the polarity data generated from the FF 191 by an invertor 193 is selectively supplied from a change-over switch 194 to the other input terminal of the FF 191. The change-over switch 194 is switched in accordance with the contents of the burst defect data read out from the image data memory 11. An AND circuit 195 is connected to one input terminal of the FF 192. The AND circuit 195 calculates the AND of the read 1 H clock signal and the read-out burst defect data and supplies the calculated AND to the FF 192 as a latch timing signal. The absolute value data read out from the image data memory 11 is supplied to the other input terminal of the FF 192. The output data of the FF 191 is the polarity data and the output data of the FF 192 is the absolute value data.

The selector 20 selectively relays and generates either one of the video data read out from the image data memory 11 and the color phase inverted video data from the color phase inverting circuit 18. A selection signal of the selector 20 is supplied from a subcarrier phase discontinuity detecting circuit 21, which will be explained hereinafter.

Figure 4:
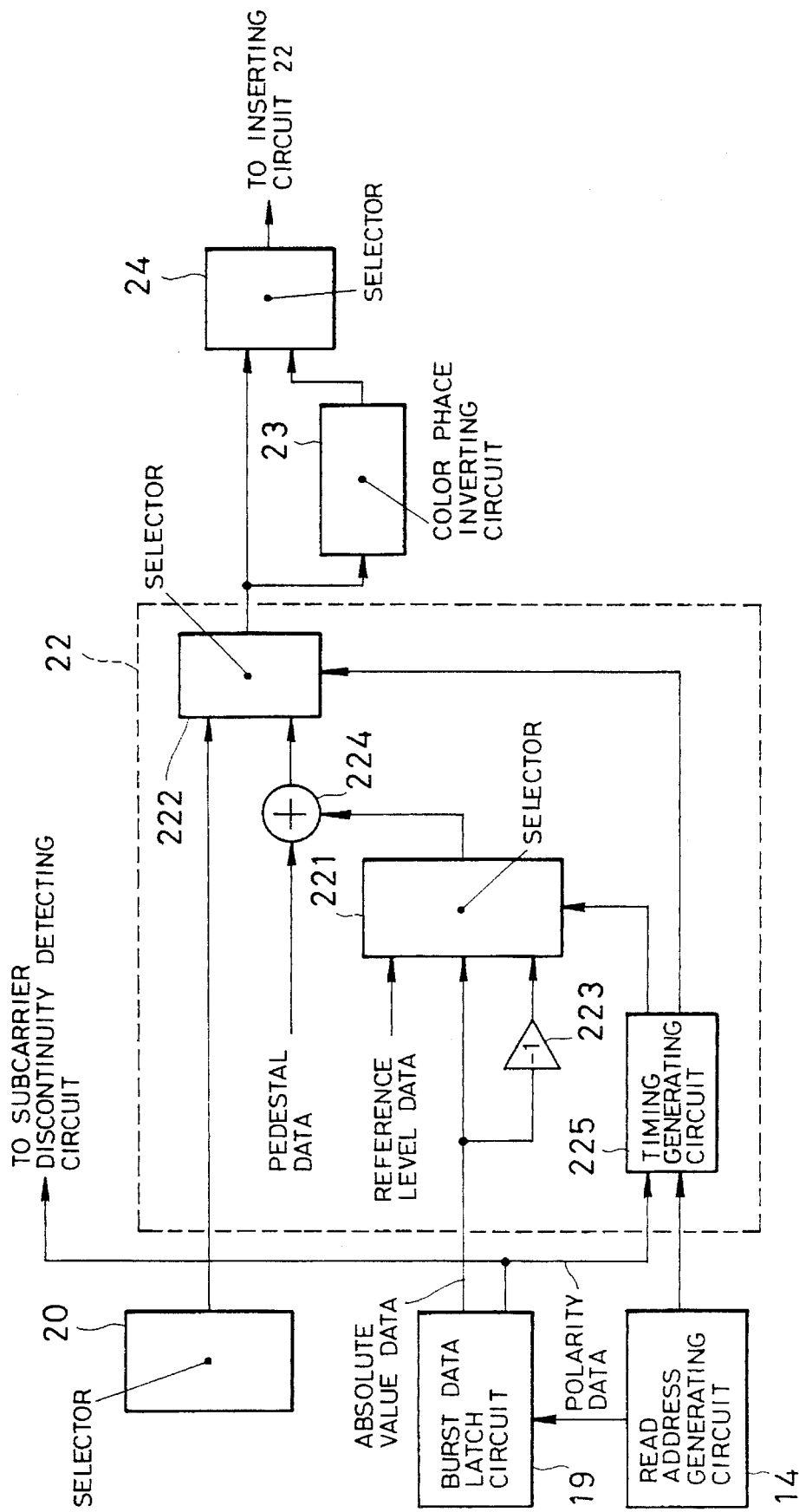
FIG. 4 is a block diagram specifically showing a burst inserting circuit.

A burst inserting circuit 22 to insert a burst component into the video data is connected to each of the outputs of the burst data latch circuit 19 and selector 20. As shown in FIG. 4, two selectors 221 and 222 are provided in the burst inserting circuit 22. The selector 221 selectively relays and generates either one of the absolute value data held in the burst data latch circuit 19, output data of a multiplier 223 which multiplies −1 to the absolute value data, and reference level data indicative of the 0 level to an adder 224. The adder 224 adds pedestal data indicative of a pedestal level to the data generated from the selector 221 and supplies the resultant data as burst data to the selector 222. The selector 222 selectively relays and generates the video data from the selector 20 or the burst data from the adder 224. A timing generating circuit 225 to control selection timings of the selectors 221 and 222 is provided in the burst inserting circuit 22. The timing generating circuit 225 generates a first selection timing signal for the selector 221 on the basis of the count value of the counter which is generated from the read address generating circuit 14 and the polarity data held in the burst data latch circuit 19 and also generates a second selection timing signal for the selector 222 on the basis of the read clock signal generated from the read address generating circuit 14.

A color phase inverting circuit 23 and a selector 24 are connected to an output of the selector 222 as an output of the burst inserting circuit 22. The color phase inverting circuit 23 inverts the color phase of the video data including the burst component which was relayed from the selector 222 and supplies the color phase inverted video data to the selector 24. The selector 24 selectively relays and generates either one of the video data including the burst component which was relayed from the selector 222 and the color phase inverted video data from the color phase inverting circuit 23. The selection signal of the selector 24 is supplied from the subcarrier phase discontinuity detecting circuit 21.

A D/A converter 26 is connected to the output of the selector 24 through a sync and pedestal inserting circuit 25. The sync and pedestal inserting circuit 25 adds the horizontal and vertical sync components and a pedestal component to the video data including the burst component generated from the selector 24, thereby generating a digital composite video signal. A timing to add the horizontal and vertical sync components and the pedestal component is controlled by a sync and pedestal timing generating circuit 27. A vertical sync timing signal from the write address generating circuit 13 and a horizontal sync timing signal from the read address generating circuit 14 are supplied to the timing generating circuit 27. The D/A converter 26 converts the digital composite video signal to the analog composite video signal.

Figure 5:
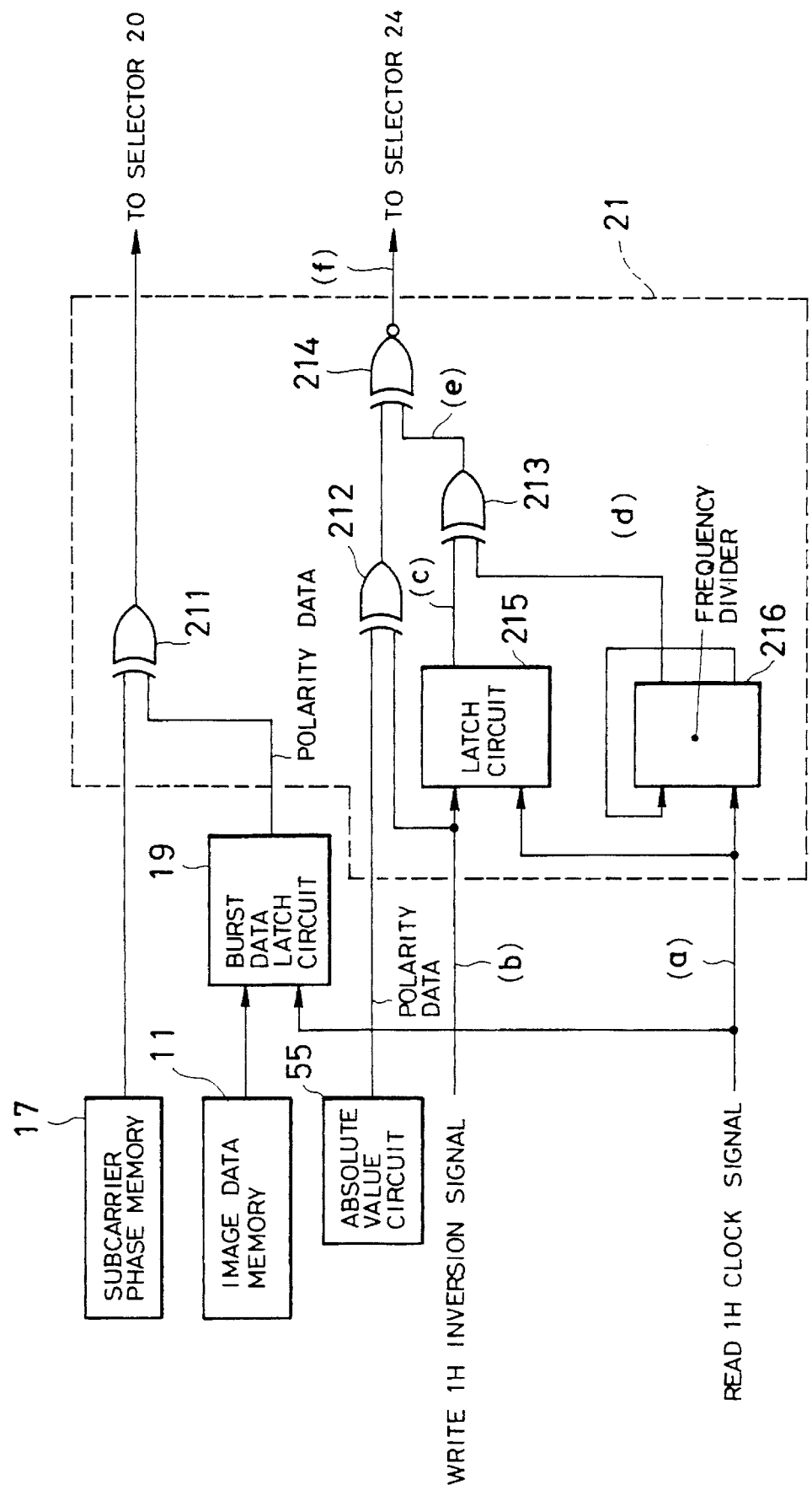
FIG. 5 is a block diagram specifically showing a subcarrier phase discontinuity detecting circuit.

In the subcarrier phase discontinuity detecting circuit 21, as shown in FIG. 5, three EX-OR circuits 211 to 213, an EX-NOR circuit 214, a latch circuit 215, and a frequency divider 216 are provided. The EX-OR circuit 211 calculates the exclusive OR of the polarity data generated from the subcarrier phase memory 17 and the polarity data held in the burst data latch circuit 19, thereby discriminating whether the polarity data coincides or not. An output signal of the EX-OR circuit 211 becomes a selection signal of the selector 20. When the polarity data coincides, the selector 20 is allowed to select to the video data read out from the image data memory 11. When the polarity data doesn't coincide, the selector 20 is allowed to select the video data in which the color phase was inverted from the color phase inverting circuit 18.

The EX-OR circuit 212 calculates the exclusive OR of the polarity data obtained by the absolute value circuit 55 and a write 1 H inversion signal generated from the write address generating circuit 13. An output signal of the EX-OR circuit 212 is supplied to one input of the EX-NOR circuit 214. The latch circuit 215 holds the level of the write 1 H inversion signal generated from the write address generating circuit 13 in response to the front edge of the read 1 H clock signal generated from the read address generating circuit 14. The frequency divider 216 divides the frequency of the read 1 H clock signal into ½, thereby generating the read 1 H inversion signal. The EX-OR circuit 213 calculates the exclusive OR of the level held by the latch circuit 215 and the read 1 H inversion signal. The EX-NOR circuit 214 further negatively calculates the exclusive OR of the output signals of the EX-OR circuits 212 and 213.

The write address generating circuit 13 has a counter (not shown) to count the write clock signal. The counter is reset in accordance with the vertical sync timing signal which is obtained by separating from the video signal in a sync separating circuit (not shown) and repeatedly counts, for example, up to 910 and generates the count value as write address data. The write address generating circuit 13 forms the write 1 H inversion signal, the burst timing signal to the latch circuit 54, the selection timing signal to the selector 10, and the vertical sync timing signal to the timing generating circuit 27 on the basis of the count value of the counter. On the other hand, the read address generating circuit 14 has a counter (not shown) to count the constant read clock signal generated from a read clock signal generating circuit 16. In a manner similar to the counter of the write address generating circuit 13, the counter is also reset in accordance with the vertical sync timing signal and repeatedly counts, for example, up to 910 and generates the count value as read address data. The read address generating circuit 14 forms the read 1 H clock signal to the latch circuit 19 and subcarrier phase discontinuity detecting circuit 21 on the basis of the count value of the counter.

Figure 6A:
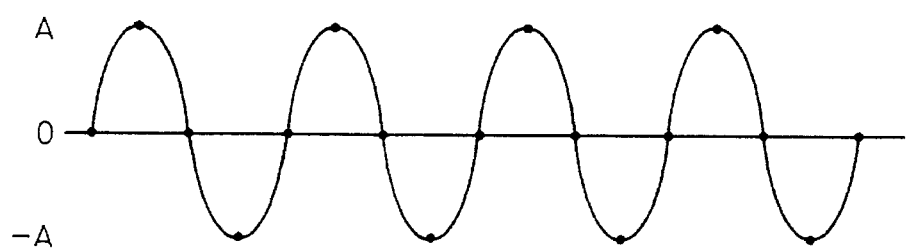
FIGS. 6A and 6B are diagrams showing waveforms of color burst signal components of two polarities.
Figure 6B:
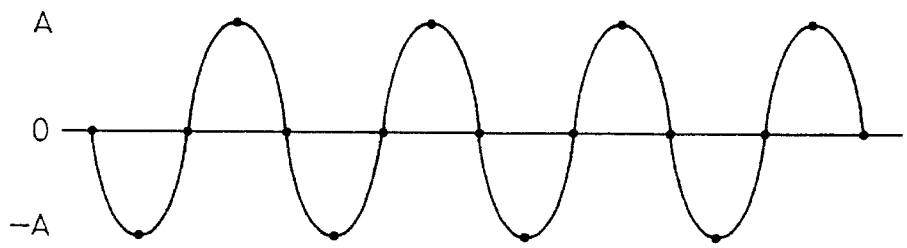

In the construction as mentioned above, the composite video signal demodulated by the FM detector circuit 2 is supplied to the A/D converter 4 through the LPF 3 and the digital video signal of eight bits is supplied from the A/D converter 4 to the burst extracting circuit 5 and selector 10. In the burst extracting circuit 5, the burst signal in the video signal is accumulated in accordance with the order of sampling by only a predetermined number of periods by the subtractor 51 and two delay registers 52 and 53. The subtractor 51 and delay registers 52 and 53 have a 10-bit signed configuration. The sampled values of the burst signal are supplied to the subtractor 51 in a manner such as 0, A, 0, −A, 0, A, 0, . . . at one of the polarities as shown in FIG. 6A and 0, −A, 0, A, 0, −A, 0, . . . at the other polarity as shown in FIG. 6B. In FIGS. 6A and 6B, black dots denote sampling points and a reference character "A" indicates an amplitude level. The accumulation results are equal to −8A at one of the polarities and 8A at the other polarity. Then, 1-bit sign data (polarity data) and 9-bit amplitude accumulation data are held by the latch circuit 54 in response to the burst timing signal at the timing which is obtained by accumulating burst four waves. In the absolute value circuit 55, the amplitude accumulation data of nine bits is set to ⅛ and the lower three bits are omitted, thereby obtaining the average amplitude data of six bits. The most significant bit is set to the polarity data and the average amplitude data of the lower six bits is set to the absolute value data. In this instance, since the amplitude of the burst signal is smaller than the amplitudes of other signal components, it can be sufficiently expressed by six bits.

Figure 7:
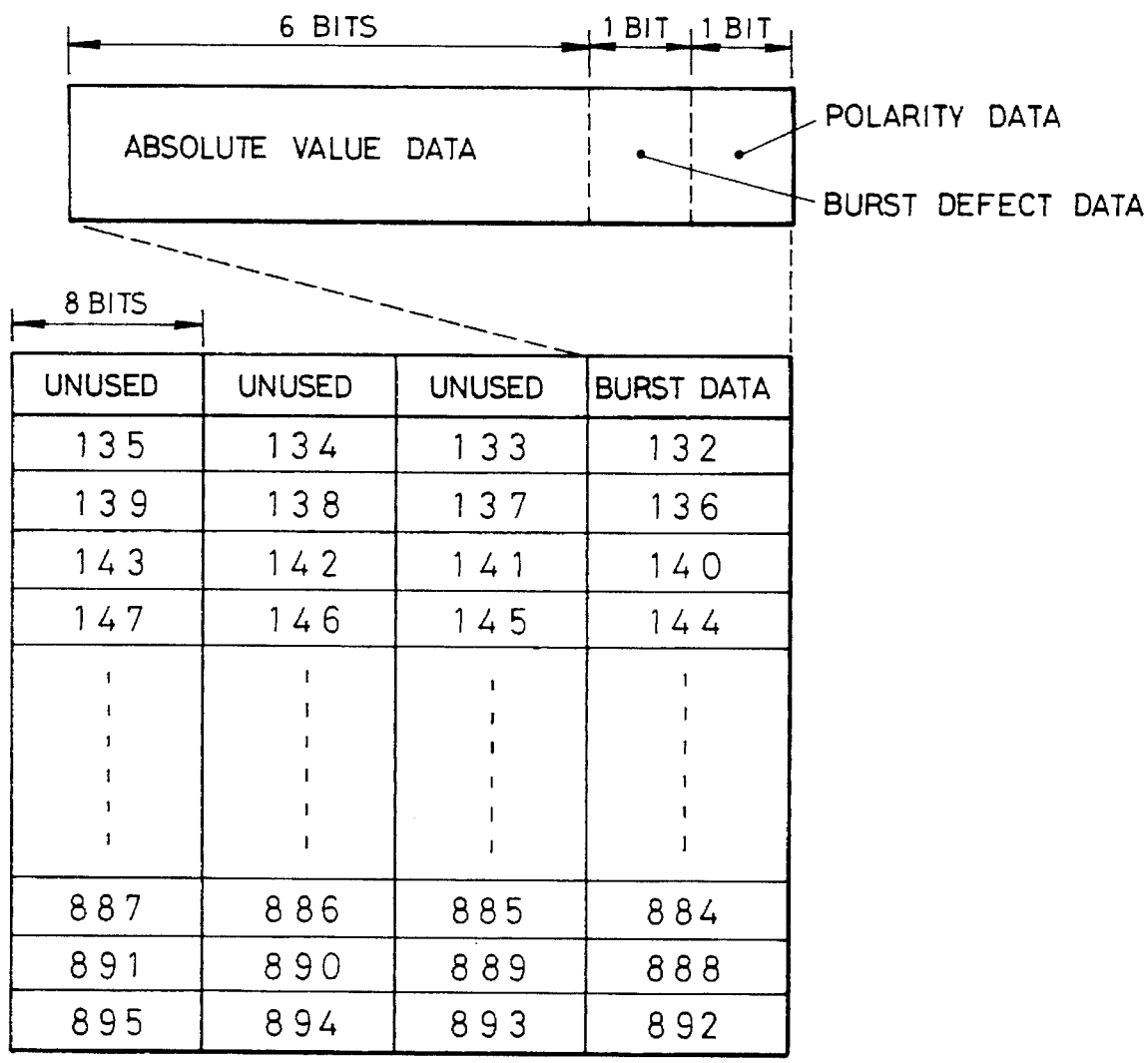
FIG. 7 is a diagram showing memory contents of an image data memory.

The selector 10 relays and transfers the data regarding the burst signal to the image data memory 11 in accordance with the order of the absolute value data, polarity data, and burst defect data in response to the selection timing signal every 1 H and also relays and transfers the video data from the A/D converter 4 to the image data memory 11 in the remaining period within 1 H. The data which is supplied from the selector 10 is written in the image data memory 11 in accordance with the write signal from the write/read control circuit 12. The writing position in the image data memory 11 is designated by the write address data generated from the write address generating circuit 13. With respect to the image data, the data from the 132nd pixel to the 895th pixel which actually forms the screen portion is written. Therefore, each data is written in the image data memory 11 as shown in FIG. 7. In FIG. 7, numerical values in the frames denote pixel numbers. When the image data from the 132nd pixel to the 895th pixel is written, the polarity data held in the absolute value circuit 55 is written in the storage locations which are sequentially designated in the subcarrier phase memory 17 in accordance with the write signal from the write/read control circuit 12.

The read addresses are sequentially designated for the image data memory 11 and the subcarrier phase memory 17 in accordance with the read signal from the write/read control circuit 12 and the data is read out from those addresses, respectively. From the image data memory 11, the absolute value data, polarity data, and burst defect data are first read out every 1 H and, after that, the video data from the 132nd pixel to the 895th pixel is read out one pixel by one. From the subcarrier phase memory 17, the polarity data is sequentially read out synchronously with the reading operation of the video data.

The absolute value data, polarity data, and burst defect data which were read out from the image data memory 11 are supplied to the burst data latch circuit 19. When the burst defect data doesn't show the generation of the drop-out for the burst signal, the absolute value data and the polarity data are held in the FFs 192 and 191 of the burst data latch circuit 19, respectively. The held absolute value data is directly supplied to the selector 221 and also to the selector 221 through the multiplier 223. Together with the absolute value data read out from the image data memory 11 and the data in which such absolute value data is set to the negative value, the reference level data indicative of the 0 level is supplied to the selector 221. The polarity data held in the latch circuit 19 is supplied to the timing generating circuit 225. The timing generating circuit 225 generates the first selection timing signal which changes the selecting order of the selector 221 in accordance with the polarity shown by the polarity data at the timing synchronized with the read clock signal. In case of one polarity shown in FIG. 6A, the selector 221 is switched so as to obtain 0, A, 0, −A, 0, A, 0, . . . , and in case of the other polarity as shown in FIG. 6B, the selector 221 is switched so as to obtain 0, −A, 0, A, 0, −A, 0, . . . The data generated from the selector 221 is added to the pedestal data by the adder 224. After that, the resultant data is supplied to the selector 222 as burst data.

The video data read out from the image data memory 11 is supplied to the selector 222 through the selector 20. The selector 222 allows the burst data or image data to be relayed in accordance with the second selection timing signal from the timing generating circuit 225. That is, the burst data is relayed and generated from the adder 224 in correspondence to the existing position of the burst signal in 1 H. In correspondence to the existing position of the video signal from the 132nd pixel to the 895th pixel in 1 H, the video data is relayed and generated. As mentioned above, the image data including the burst component which is relayed from the selector 222 is supplied to the sync signal and pedestal level inserting circuit 25 through the selector 24. The sync and pedestal inserting circuit 25 adds the horizontal and vertical sync components and the pedestal component to the video data including the burst component, thereby generating the digital composite video signal. The digital composite video signal is converted to the analog composite video signal by the D/A converter 26 and is supplied to a television receiver (not shown).

The above operations are executed in the case where there is no drop-out in the demodulated video signal. On the other hand, when a drop-out is detected from the demodulated video signal by the drop-out detecting circuit 15, a drop-out detection signal is supplied from the drop-out detecting circuit 15 to the write/read control circuit 12. The write/read control circuit 12 stops the writing operations to the image data memory 11 and subcarrier phase memory 17 in accordance with the drop-out detection signal. No video data is written at the storage location designated in this instance of the image data memory 11, but the video data which has already been written is held. No polarity data is written at the storage location designated in this instance in the subcarrier phase memory 17, but the polarity data which has already been written is held. That is, since the video data and the polarity data of 1 H before is stored at the storage locations designated by the write address data, the video data and the polarity data of 1 H before is maintained as they are in the drop-out period.

Figure 8A:
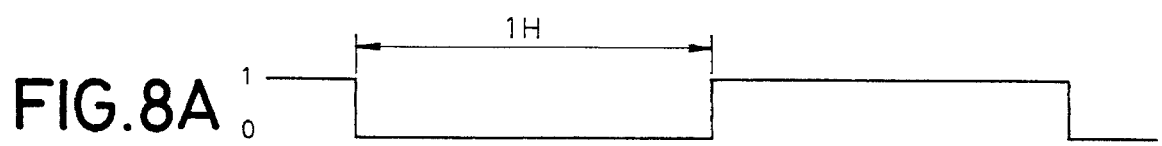
FIGS. 8A, 8B, and 8C are waveform diagrams to show the operation when a signal drop-out occurs.
Figure 8B:
Figure 8C:

The polarity data generated from the absolute value circuit 55 is inverted every 1 H as shown in FIG. 8A and the polarity data which changes as mentioned above is written to the image data memory 11 as one of the data regarding the burst signal. The polarity data generated from the absolute value circuit 55 is written in the subcarrier phase memory 17 as the same data for 1 H synchronously with the write clock signal. FIG. 8B continuously shows the polarity data written in the subcarrier phase memory 17 in accordance with the order of the addresses. When the drop-out detection signal is generated from the drop-out detecting circuit 15 as shown by D/0 in FIG. 8C, however, the writing operation by the write/read control circuit 12 is stopped, so that the data of 1 H before is maintained at the storage location designated by the write address data in this instance.

In 1 H during which no drop-out detection signal is generated, since all of the polarity data held in the burst data latch circuit 19 and the polarity data sequentially read out from the subcarrier phase memory 17 coincide, a low level signal is generated from the EX-OR circuit 211. The low level signal allows the selector 20 to relay the image data read out from the image data memory 11. On the other hand, in 1 H during which the drop-out detection signal is generated, a situation such that the polarity data which was sequentially read out from the subcarrier phase memory 17 doesn't coincide with the polarity data held in the burst data latch circuit 19 occurs. When the polarity data doesn't coincide, a high level signal is generated from the EX-OR circuit 211 and allows the selector 20 to relay the color phase inverted video data from the color phase inverting circuit 18. Since the video data of 1 H before is read out from the image data memory 11 and the phase of the video data is inverted by 180° and the resultant video data is generated in the portion where the drop-out occurs, therefore, the phase inverting condition of every 1 H of the color signal is maintained.

When a drop-out occurs in the burst signal, the burst defect data indicates the occurrence of the drop-out and is written into the image data memory 11. The burst defect data is set to 1 when no drop-out occurs in the burst signal. The burst defect data is set to 0 when the drop-out occurs in the burst signal. When the absolute value data, polarity data, and burst defect data are read out from the image data memory 11, so long as the read-out burst defect data is equal to 0, the polarity data and the absolute value data which were read out are not held in the FFs 191 and 192 in the burst data latch circuit 19. The FF 192 holds the absolute value data of 1 H before which was held so far as it is. Since the change-over switch 194 relays the output data of the invertor 192 to one input terminal of the FF 191 in accordance with the burst defect data, the FF 191 holds and generates the data obtained by inverting 01 of the polarity data of 1 H before. In the burst inserting circuit 22, since the absolute value data of 1 H before and the polarity data which indicates the phase opposite to that of the data of 1 H before are supplied, the burst data that is generated from the adder 224 satisfies the phase inverting condition of every 1 H and also indicates a proper amplitude.

Figure 9A:
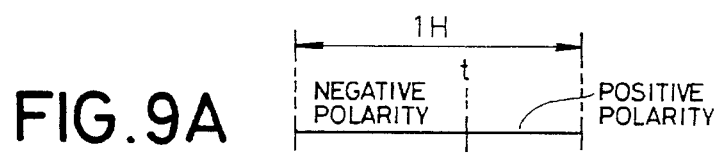
FIGS. 9A, 9B, and 9C are diagrams to show the operation in a state in which the reading position is advanced than the writing position in the image data memory.
Figure 9B:
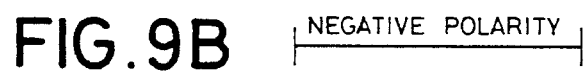
Figure 9C:
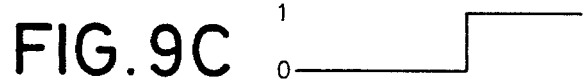

Although the frequency of the write clock signal fluctuates due to a jitter included in the demodulated video signal, since the read clock signal has a predetermined period, there occurs a situation such that the reading position is advanced from the writing position in each of the image data memory 11 and the subcarrier phase memory 17. When the reading position is advanced from the writing position during 1 H, the polarity data which is read out from the subcarrier phase memory 17 becomes the data of the previous line (horizontal scan line). For example, as shown in FIG. 9A, the polarity shown by the polarity data is inverted at a time point t at which the reading position outruns the writing position. Such polarity data differs from the polarity data (FIG. 9B) of the present line held in the burst data latch circuit 19. Since the high level signal is generated from the EX-OR circuit 211 as shown in FIG. 9C, therefore, in a manner similar to the case of the occurrence of the drop-out, the color phase inverted video data from the color phase inverting circuit 18 is supplied to the sync signal and pedestal level inserting circuit 25 through the selectors 20 and 222 and, further, the selector 24. In the portion in which the reading position is advanced from the writing position during 1 H, accordingly, the video data of 1 H before is read out from the image data memory 11 and its phase is inverted by 180 and the resultant data is generated, so that the phase inverting condition of every 1 H of the color signal is maintained.

In a state in which the reading position is advanced from the writing position, when the reading system starts the operation to read out the video data for the next line, the read 1 H clock signal is generated before the polarity data in the image data memory 11 is rewritten, so that the polarity data to be held in the burst data latch circuit 19 in accordance with the read 1 H clock signal is the same as that of the previous line. The burst data which is derived from the adder 224 of the burst inserting circuit 22, therefore, is not phase inverted and is produced by the same data as that of the previous line. Further, since the polarity data which is read out from the subcarrier phase memory 17 is also read out before new polarity data is written, it is the data of the previous line. The low level signal is generated from the EX-OR circuit 211, therefore, and the selector 20 is allowed to relay the read-out image data from the image data memory 11 to the selector 222. In a state in which the reading position is advanced from the writing position, when the reading system starts the reading operation for scanning the next line, consequently, the image data including the burst component in which the phase of the subcarrier is not inverted is relayed from the selector 222.

In order to solve such an defect, the present digital time base corrector operates as follows. The latch circuit 215 holds the level of the write 1 H inversion signal in response to the leading edge of the read 1 H clock signal. As shown in FIG. 10A, the read 1 H clock signal is a pulse signal of a predetermined period. As shown in FIG. 10B, the write 1 H inversion signal is a signal whose level is inverted every 1 H and is also a signal such that a duration of 1 H fluctuates by the jitter component. In a state in which the writing position is advanced from the reading position, accordingly, a time point when the read 1 H clock signal rises is a point just after the level of the write 1 H inversion signal was inverted. In a state in which the reading position is advanced from the writing position, however, as shown in FIGS. 10A to 10G, at a time point T1 when the read 1 H clock signal rises, the write 1 H inversion signal is in a state in which the level is not yet inverted, the latch circuit 215 holds the same level as the level at a previous rising time point of the read 1 H clock signal. Since the level of the read 1 H inversion signal which is generated from the frequency divider 216 is inverted at the time point T1 as shown in FIG. 10D, two input levels of the EX-OR circuit 213 are different. At the time point T1, the EX-OR circuit 213 generates the high level signal as shown in FIG. 10E and supplies to one input of the EX-NOR circuit 214. In the EX-OR circuit 212 which supplies the signal to the other input of the EX-NOR circuit 214, if the phase of the subcarrier of the demodulated video signal has been inverted every 1 H, the level of the polarity data from the absolute value circuit 55 and the level of the write 1 H inversion signal which are respectively supplied coincide, the low level signal is generated. An output of the EX-NOR circuit 214, therefore, is set to the high level at the time point T1 as shown in FIG. 10F. In response to such a high level signal, the selector 24 is switched so as to relay and generate the output signal of the color phase inverting circuit 23. Since the phase of the image data including the burst component relayed from the selector 222 is inverted by the color phase inverting circuit 23, even if the reading system executes the operation to read out the video data for the next line in a state in which the reading position is advanced from the writing position, the phase inverting condition of every 1 H of the color signal is maintained, for example, as shown in FIG. 10G.

At a time point T2 shown in FIGS. 10A to 10G, even when the reading system starts the operation to read out the video data for the further next line in a state in which the reading position is advanced from the writing position, the output of the EX-NOR circuit 214 is set to the high level by the above operation, so that the selector 24 relays and generates the output signal of the color phase inverting circuit 23. The phase of the image data including the burst component relayed from the selector 222 is inverted by the color phase inverting circuit 23. At a time point T3 shown in FIGS. 10A to 10G, since the apparatus is returned to a state in which the writing position is advanced from the reading position and the reading system executes the operation to read out the video data for the further next line, the selector 24 relays and generates the output signal of the burst inserting circuit 22. The image data including the burst component relayed from the selector 222 is added with sync and pedestal components as it is. After that, the resultant data is generated as a reproduction video signal from the D/A converter 26.

In the above embodiment, although the image data memory 11 and subcarrier phase memory 17 have individually been provided, it will be obviously understood that they can be also provided as a single memory. Although the burst data such as polarity data and the like derived by the burst extracting circuit 5 has been written into the image data memory 11, it may be also written into another memory.

According to the digital time base corrector of the present invention as mentioned above, the absolute value data of the amplitude and the polarity data of the burst signal in the color video signal are written into the memory every horizontal scan period. The signal in which the sync signal interval, pedestal level interval, and burst signal interval in the color video signal are eliminated is written as image data into the memory. When the absolute value data, polarity data, and image data are read out from the memory, the burst signal data is reproduced on the basis of the absolute value data and polarity data. By inserting the burst signal data, sync signal data, and pedestal level data into the image data, the digital color video signal is formed and is converted to the analog signal. Since the burst signal in the color video signal as digital data doesn't need to be written into the memory as it is, only the signal portion in which the sync signal interval, pedestal level interval, and burst signal interval in the color video signal are eliminated is written as data into the memory. The storage capacity of the memory can be fairly reduced than that of the conventional apparatus. The costs of the apparatus can be reduced.

What is claimed is:

1. A digital time base corrector comprising:

A/D converting means for converting a composite color video signal which was read out and reproduced from a recording medium into a digital signal;

means for extracting a burst signal in said digital signal every horizontal scan period and generating absolute value data of an amplitude of said burst signal and polarity data of said burst signal;

writing means for writing said absolute value data and said polarity data into a memory and for writing the portion in which a sync signal interval, a pedestal level interval, and a burst signal interval in said digital signal are eliminated into said memory as image data;

reading means for reading out said absolute value data, said polarity data, and said image data from said memory;

burst reproducing means for reproducing burst signal data on the basis of said absolute value data and said polarity data which were read out;

data inserting means for inserting said burst signal data, sync signal data, and pedestal level data into said image data read out; and D/A converting means for converting output data of said data inserting means into an analog signal and for outputting said analog signal as a color video signal.

2. A digital time base corrector according to claim 1, further comprising:

drop-out detecting means for generating defect data indicating whether a drop-out has occurred in the burst signal of said composite color video signal or not, and wherein said defect data is written into said memory by said writing means together with said absolute value data and said polarity data, said defect data is read out from said memory by said reading means together with said absolute value data and said polarity data, and when said defect data read out indicates the occurrence of the drop-out, said burst reproducing means reproduces the burst signal data on the basis of said absolute value data and said polarity data which were read out before one horizontal scan period.

* * * * *